Figure 1:
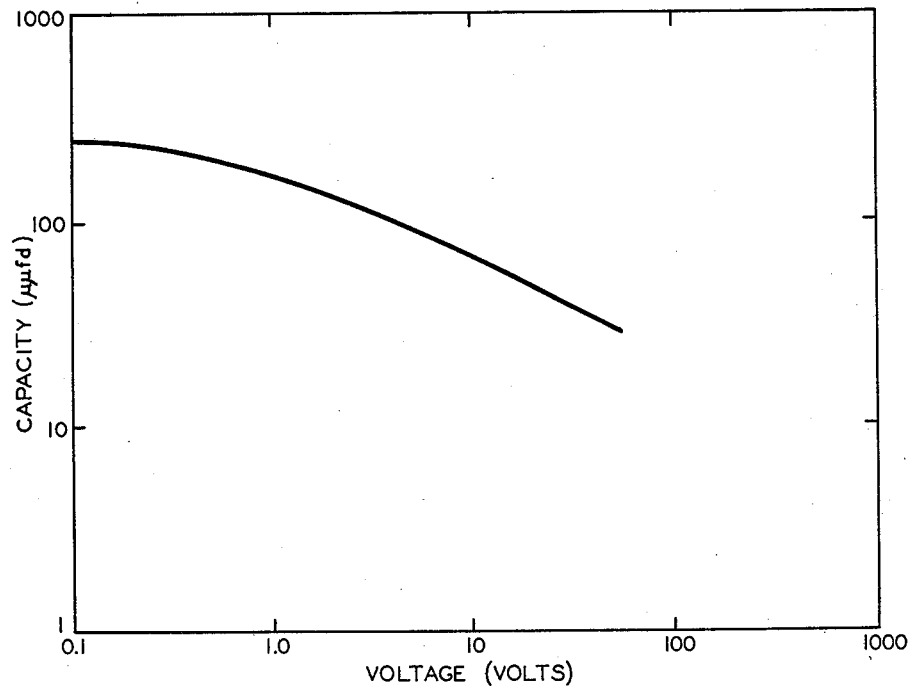

Dec. 25, 1962  D. A. FLUEGEL  3,070,309
VOLTAGE-SENSITIVE CAPACITOR BRIDGE MULTIPLIER
Filed Sept. 20, 1961  2 Sheets-Sheet 1

INVENTOR.
D. A. FLUEGEL
BY Hudson & Young
ATTORNEYS

Dec. 25, 1962          D. A. FLUEGEL          3,070,309

VOLTAGE-SENSITIVE CAPACITOR BRIDGE MULTIPLIER

Filed Sept. 20, 1961          2 Sheets-Sheet 2

*INVENTOR.*
D. A. FLUEGEL

BY Hudson + Young

*ATTORNEYS*

United States Patent Office

3,070,309
Patented Dec. 25, 1962

3,070,309
VOLTAGE-SENSITIVE CAPACITOR BRIDGE MULTIPLIER
Dale A. Fluegel, Bartlesville, Okla., assignor to Phillips Petroleum Company, a corporation of Delaware
Filed Sept. 20, 1961, Ser. No. 139,415
7 Claims. (Cl. 235—194)

This invention relates to the computation of quantities. In one aspect the invention relates to an improved method and apparatus for performing multiplication. In another aspect the invention relates to systems for producing an output voltage proportional to the product of a number of input voltages. In yet another aspect the invention relates to an improved method of computation, such as multiplication, which can be performed rapidly and accurately through the utilization of a voltage-sensitive capacitor bridge. In a further aspect the invention relates to the utilization of voltage sensitive variable capacitors in analog multiplication circuits.

In performing computations, it is often necessary to determine the product of two or more measured quantities or to find the square or some other power of a single quantity. Such computations are often performed in electrical analog systems where a voltage proportional to the product of two or more input voltages or to the square or higher power of a single input voltage is to be obtained. It is desirable that such an electrical multiplying system be both accurate and fast, have high resolution, and be without discontinuities.

Thus, according to the invention, there is provided a new and improved electrical multiplying system comprising a bridge incorporating voltage-sensitive capacitors, such as silicon or germanium capacitors, means for converting a first D.C. signal into an A.C. signal, means for applying the A.C. signal to two corners of the bridge, means for applying a second D.C. signal across the voltage-sensitive capacitors in two arms of the bridge, and means for applying the bridge output to a demodulator along with a reference signal from the means for converting, the output of the demodulator representing the multiplication product. In one embodiment of the invention the second D.C. signal is applied to one arm of the bridge while the inverse of the second D.C. signal is applied to a second arm of the bridge. In a second embodiment of the invention the voltage-sensitive capacitors are placed "back to back" in one arm of the bridge and "face to face" in the second arm of the bridge, permitting the second D.C. signal to be applied to both arms without requiring an inverter for one arm.

Accordingly, it is an object of the invention to provide an improved and simplified method of performing multiplication. Another object of the invention is to provide a simple analog multiplier having very good accuracy. Yet another object is to provide a novel and improved analog multiplier system.

Other objects, aspects and the several advantages of the invention will be apparent from a study of the disclosure, the drawings and the appended claims.

Figure 3:
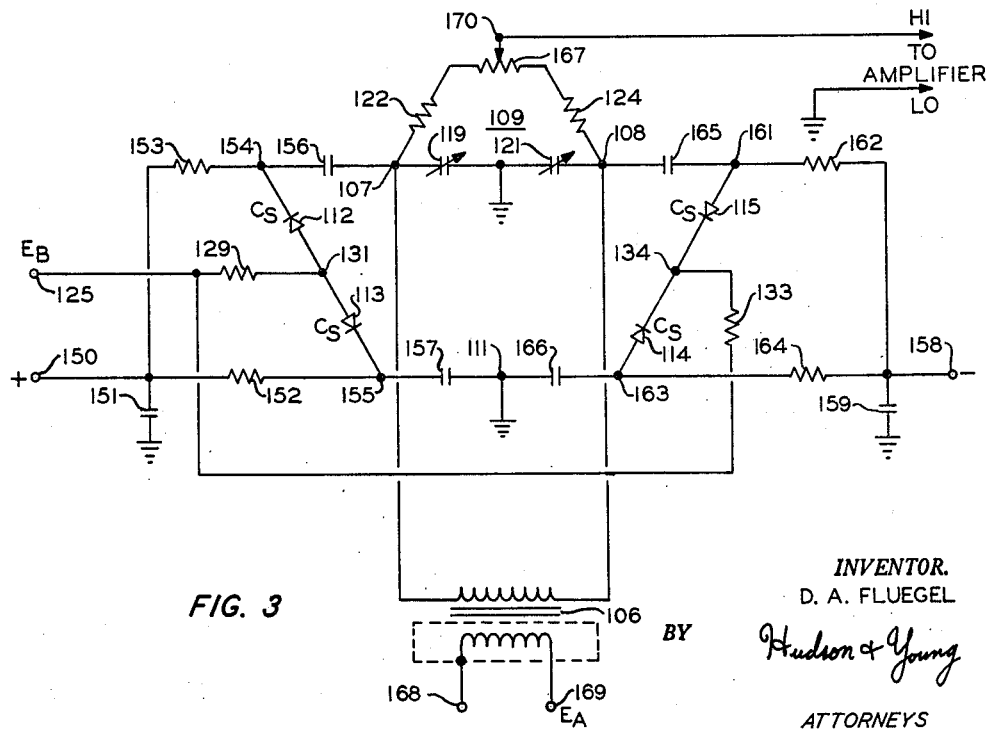
Figure 2:
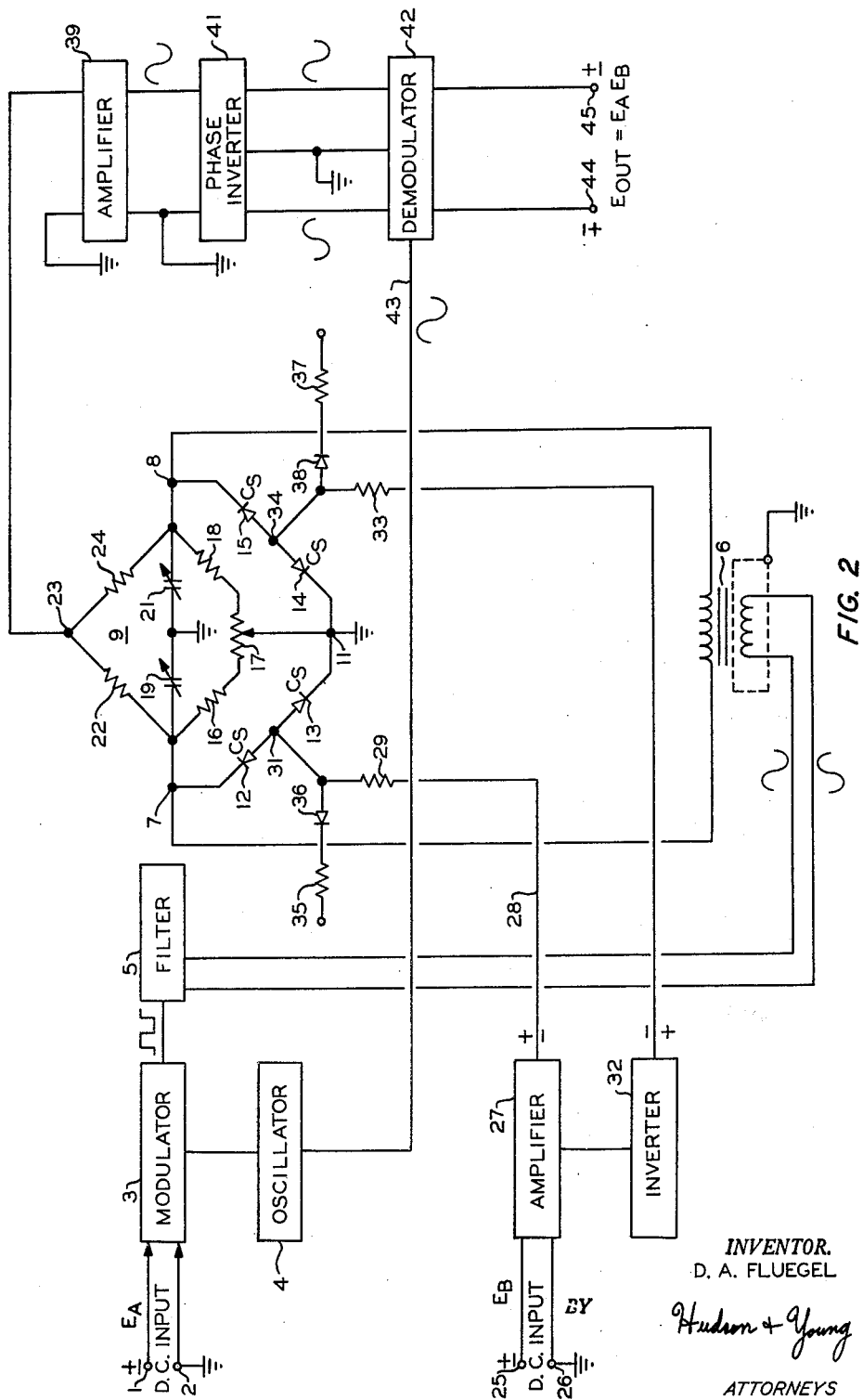

In the drawing, FIGURE 1 is a graph showing a typical voltage versus capacity curve for silicon capacitors. FIGURE 2 is a schematic representation of a voltage-sensitive capacitor bridge multiplier according to a first embodiment of the invention. FIGURE 3 is a schematic representation of a voltage-sensitive capacitor bridge multiplier according to a second embodiment of the invention.

Silicon capacitors, which are particularly suitable for use in the invention, are p-n junctions formed in single-crystal silicon by techniques used in the manufacture of semiconductor devices. At a p-n junction the density of charge carriers (electrons in the n region and holes in the p region) is reduced virtually to zero when a voltage is applied across the junction in the reverse direction from that causing easy current flow. As the voltage increases, the region of zero carrier density, known as the depletion region, gets wider. In effect this moves apart the two conducting areas and decreases the capacity as if there were two metal plates separated by a dielectric whose thickness was variable. The area of the plates remains the same; the dielectric constant is unchanged; but the thickness of the dielectric varies according to the applied voltage.

The junction can be biased at any desired value as low as zero volts (or even up to 0.4 volt in the opposite direction) regardless of the magnitude of the signal voltage. In the normal bias direction, the capacity will continue to decrease as the voltage is increased. Thus, as shown in FIGURE 1, the capacity of a typical silicon capacitor can decrease from a value of approximately 240 mmf. corresponding to an applied voltage 0.1 volt to a value of approximately 30 mmf. corresponding to an applied voltage of 50 volts. As the voltage in the normal bias direction is decreased the capacity will increase.

In FIGURE 2 there is shown a circuit for performing the operation $E_0 = E_A \cdot E_B$. $E_A$ and $E_B$ can be either D.C. signal or slowly varying A.C. signals. $E_A$ is applied to the input terminals 1 and 2 of modulator 3. Modulator 3 can be a conventional device such as Demodulator model 1802, Serial Number 707, manufactured by Varo Mfg. Co., Inc. of Garland, Texas. Modulator 3 is energized by oscillator 4, which can be a conventional type, such as one utilizing a transistor with suitable tuned circuits, and which is adapted to produce an A.C. signal having a suitable frequency, such as 40 kc. The high frequency oscillator signal is fed into modulator 3 to cause the modulation of $E_A$ into a high frequency signal, which is then passed through filter 5 to smooth out the signal. The filtered signal is then transmitted to transformer 6, the primary of which is shielded. While transformer 6 can be of conventional construction, the transformer disclosed in my copending application Serial No. 659,683, filed May 16, 1957, is preferred. The secondary of transformer 6 is connected to terminals 7 and 8 of bridge 9.

In the bridge arm between terminals 7 and 11, silicon capacitors 12 and 13 are connected in series in a back to back relationship, as are silicon capacitors 14 and 15 in the bridge arm between terminals 8 and 11. Suitable silicon capacitors are HC 7005, manufactured by Hughes Aircraft Co., of Newport Beach, California. Resistance 16, balancing resistance 17 and resistance 18 are connected in series between terminals 7 and 8 while the contactor of balancing resistance 17 is connected to terminal 11. Terminal 11 is connected directly to ground while terminals 7 and 8 are connected to ground through balancing capacitors 19 and 21, respectively. A resistance 22 is connected between bridge terminals 7 and 23 while resistance 24 is connected between bridge terminals 8 and 23.

$E_B$ is applied to input terminals 25 and 26 of amplifier 27, wherein two outputs proportional to $E_B$ are produced. The first output is transmitted through lead 28 and resistance 29 to the junction 31 between silicon capacitors 12 and 13. The second output is passed through inverter 32, and then the inverted signal is transmitted through resistance 33 to the junction 34 between silicon capacitors 14 and 15. Bias is applied to junctions 31 and 34 through resistance 35 and rectifier 36 and through resistance 37 and rectifier 38, respectively.

The output of bridge 9 is taken from terminals 23 and 11 and transmitted to amplifier 39. The amplified signal is then passed through phase inverter 41 to demodulator 42. Demodulator 42 can be a conventional device such as Demodulator model 1802, Serial Number 707, manufactured by Varo Mfg. Co. of Garland, Texas. A reference signal from oscillator 4 is transmitted by lead 43 to demodulator 42. The demodulated signal, which is proportional to the multiplication product $E_A E_B$, is produced at output terminals 44 and 45.

In FIGURE 3 there is shown a modification of the bridge circuit which does not require the utilization of an inverter for one of the input signals. $E_A$ is passed through a modulator and filter (not shown) as in the system of FIGURE 2 before it is applied to terminals 168 and 169 of transformer 106, which corresponds to transformer 6 in FIGURE 2. The secondary of transformer 106 is connected across terminals 107 and 108 of bridge 109.

Silicon capacitors 112 and 113 are connected in series in "back to back" relationship between terminals 154 and 155. Terminals 154 and 155 are connected to bridge terminals 107 and 111 through isolation capacitors 156 and 157, respectively. Silicon capacitors 114 and 115 are connected in series in "front to front" relationship between terminals 161 and 163. Terminals 161 and 163 are connected to bridge terminals 108 and 111 through isolation capacitors 165 and 166, respectively. Bridge terminal 111 is connected to ground while bridge terminals 107 and 108 are connected to ground through balancing capacitors 119 and 121, respectively. Resistance 122, balancing resistance 167, and resistance 124 are connected in series between bridge terminals 107 and 108 while the contactor of balancing resistance 167 is connected to bridge terminal 170.

$E_B$ is applied between input terminal 125 and ground, and through resistance 129 to the junction 131 between silicon capacitors 112 and 113, and through resistance 133 to the junction 134 between silicon capacitors 114 and 115. A positive bias voltage is applied to terminals 154 and 155 through resistances 153 and 152, respectively, while a negative bias voltage is applied to terminals 161 and 163 through resistances 162 and 164, respectively. Bias input terminals 150 and 158 are connected to ground through A.C. bypass capacitors 151 and 159, respectively, to eliminate the effect of noise and stray currents in the bias circuits.

The bridge output is taken from terminals 111 and 170 and applied to an amplifier, phase inverter, and demodulator (not shown) in a manner similar to that shown in FIGURE 2.

In the operation of the system of FIGURE 2, the output of oscillator is utilized to modulate the $E_A$ input signal. The modulated signal is applied through filter 5 and transformer 6 across the terminals 7 and 8 of bridge network 9. It should be obvious that this network forms a capacity bridge. The bridge is initially balanced by varying balancing capacitors 19 and 21 and potentiometer 17 until the bridge output voltage across terminals 11 and 23 is zero. The application of a signal voltage to junctions 31 and 34 causes the bridge to become unbalanced and results in the potential at terminal 23 changing from ground potential. Any unbalance in the resistances 16, 17 and 18 also results in the potential at terminal 23 changing from ground potential. However this latter potential is 90° out of the phase with the potential due to a change in capacity of silicon capacitors. The unbalance signal between terminals 23 and 11 is applied to the input terminals of amplifier 39, wherein the signal is amplified. The amplified signal is inverted in phase inverter 41 and then applied as a first input to demodulator 42, while a reference signal from oscillator 4 is applied as a second input to demodulator 42. Thus, the two signals applied to demodulator 42 are of the same frequency because they are both obtained from oscillator 4.

Demodulator 42 produces a D.C. output signal, the magnitude of which is determined by the amplitude and phase of the A.C. signal produced by bridge network 9. For a positive value of $E_B$, the capacity of the silicon capacitors in one arm will increase while the capacity of the silicon capacitors in the second arm will decrease, causing the bridge to be unbalanced in a first direction. For a negative value of $E_B$, the capacity of the silicon capacitors in the first arm will decrease while the capacity of the silicon capacitors in the second arm will increase, causing the bridge to be unbalanced in the opposite direction. The polarity of $E_A$ will affect the polarity of the output of modulator 3 and then polarity of the potential applied across terminals 7 and 8, which in turn affects the polarity of the output signal at terminals 11 and 23. When the bridge output signal is in phase with the oscillator output, the D.C. output signal of demodulator 42 will be positive, whereas, if the bridge output signal is out of phase with the oscillator output, the D.C. output signal of demodulator 42 will be negative. Thus the bridge network performs multiplication for both positive and negative values of $E_A$ and $E_B$.

The basic operation of the system of FIGURE 3 is the same as that of the system of FIGURE 2. The only major difference is that in FIGURE 3 it is possible to eliminate the requirement of an inverter for $E_B$ by reversing the connection of one group of silicon capacitors from back-to-back to front-to-front.

The unbalancing voltage $E_B$ applied to the silicon capacitors causes an output voltage from the bridge circuit which can be made linear with respect to the applied unbalancing voltage. The bias networks associated with the silicon capacitors are provided to change the slope of the input voltage at the zero crossover to provide equal sensitivity in micromicrofarads per input volt for both positive and negative inputs. The bias applied to the silicon capacitors is such that none of the silicon capacitors will conduct for any part of the signal. The value of the bias can be on the order of 5 volts while the value of the signal inputs can be on the order of 10 to 12 volts.

The application of the $E_B$ to one arm of the bridge and $-E_B$ to the second arm of the bridge in FIGURE 2 causes the silicon capacitors in one arm to increase in capacitance while the silicon capacitors in the other arm decrease in capacitance. Similarly, the reversal of the "back to back" connection of the silicon capacitors in one arm of the bridge in FIGURE 3 to a "front to front" connection causes one arm to decrease in capacitance as the other arm increases in capacitance. The utilization of the system of the invention permits obtaining an accuracy of better than 0.1%.

When it is desired to obtain a square of a number, then the voltage representative of that number can be applied to the $E_A$ input terminals and the $E_B$ input terminals and $E_0$ will be proportional to $E_A E_B$ or $E_A^2$.

Reasonable variation and modification are possible within the scope of the disclosure, the drawings and the appended claims to the invention, the essence of which is the utilization of voltage sensitive silicon capacitors in an analog multiplying bridge circuit.

What is claimed is:
1. An analog multiplier comprising, in combination:
 (1) a bridge circuit, comprising first and second silicon capacitors connected in series in back to back relationships in a first arm of said bridge circuit, third and fourth silicon capacitors connected in series in back to back relationship in a second arm of said bridge circuit, said first arm having first and second bridge terminals, said second arm having third and fourth bridge terminals, said first and third bridge terminals being connected together and to ground, third and fourth arms of said bridge circuit being connected to a fifth bridge terminal and said second and fourth bridge terminals, respectively;
 (2) a first signal input circuit comprising first and second input terminals, an oscillator, means for modulating the voltage on said first and second input terminals responsive to the output of said oscillator, means for filtering the thus modulated voltage, a transformer, means for applying the thus filtered voltage to the primary of said transformer, means for connecting the secondary of said transformer to said second and fourth bridge terminals;

(3) a second signal input circuit comprising third and fourth input terminals, means for amplifying the voltage on said third and fourth input terminals, means for applying the thus amplified voltage to a first junction between said first and second silicon capacitors, means for applying the inverse of said thus amplified voltage to a second junction between said third and fourth silicon capacitors;

(4) a biasing means comprising a first source of bias voltage, means for connecting said first source through a resistance and a rectifier to said first junction so as to prevent flow of current from said first junction to said first source, a second source of bias voltage, means for connecting said second source through a resistance and a rectifier to said second junction so as to prevent flow of current from said second junction to said second source; and (5) an output circuit comprising means for amplifying the voltage between said fifth bridge terminal and ground, means for inverting the phase of the thus amplified voltage, means for demodulating the thus inverted voltage responsive to the output of said oscillator, the thus demodulated voltage being proportional to the multiplication product of the voltage on said first and second input terminals and the voltage on said third and fourth input terminals.

2. An analog multiplier comprising in combination:
(1) a bridge circuit comprising first and second silicon capacitors connected in series and back to back relationship in a first arm of said current circuit, third and fourth silicon capacitors connected in series in front to front relationship in a second arm of said bridge circuit, said first and second arms being adjacent in the bridge circuit, said first arm having first and second bridge terminals, said second arm having third and fourth bridge terminals, said first and third bridge terminals being connected to ground through first and second isolation capacitors, respectively; a third arm of said bridge circuit connected between fifth and sixth bridge terminals, a fourth arm of said bridge circuit connected between said fifth bridge terminal and a seventh bridge terminal, said sixth and seventh bridge terminals being connected to said second and fourth bridge terminals through third and fourth isolation capacitors, respectively;

(2) a first signal input circuit comprising first and second input terminals, an oscillator, means for modulating the voltage on said first and second input terminals responsive to the output of said oscillator, means for filtering the thus modulated voltage, a transformer, means for applying the thus filtered voltage to the primary of said transformer, means for connecting the secondary of said transformer to said sixth and seventh bridge terminals;

(3) a second signal input circuit comprising third and fourth input terminals and means for applying the voltage on said third and fourth input terminals to a first junction between said first and second silicon capacitors and to a second junction between said third and fourth silicon capacitors;

(4) a biasing means comprising a first source of bias voltage, means for connecting said first source to said first bridge terminal and to said second bridge terminal, a second source of bias voltage, means for connecting said second source to said third and fourth bridge terminals; and (5) an output circuit comprising means for amplifying the voltage between said fifth bridge terminal and ground, means for inverting the phase of the thus amplified voltage, means for demodulating the thus inverted voltage responsive to the output of said oscillator, the demodulated voltage being proportional to the multiplication product of the voltage on said first and second input terminals and the voltage on said third and fourth input terminals.

3. A system for producing an output voltage proportional to a multiplication product of a first input voltage and second input voltage, comprising in combination:
(1) a bridge circuit comprising first and second voltage sensitive capacitors connected in the first arm of said bridge circuit, third and fourth voltage sensitive capacitors connected in a second arm of said bridge circuit, said first and second arms being adjacent arms in said bridge circuit and having a common terminal, third and fourth arms connected between an output bridge terminal and the non-common terminals of said first and second arms;

(2) a first signal input circuit comprising means for converting said first input voltage into a high frequency A.C. voltage, means for applying said high frequency A.C. voltage across said non-common terminals of said first and second arms;

(3) a second signal input circuit comprising means for applying said second input voltage to a first junction between said first and second voltage-sensitive capacitors, means for applying the inversion of said second input voltage to a second junction between said third and fourth voltage sensitive capacitors;

(4) a biasing means comprising means for biasing said first and second junctions so as to prevent conduction by any of said voltage sensitive capacitors; and (5) an output circuit comprising means for amplifying the voltage between said output bridge terminal and said common terminal, means for inverting the thus amplified voltage, means for converting the thus inverted voltage into a D.C. voltage proportional to the multiplication product of first and second input voltages.

4. An analog multiplier having first, second, third and fourth bridge terminals, first and second voltage sensitive capacitors connected in series between said first and second bridge terminals, third and fourth voltage sensitive capacitors connected in series between said second and third bridge terminals, a third arm of said bridge connected between said first and fourth bridge terminals, a fourth arm of said bridge connected between said third and fourth bridge terminals, an oscillator, means for modulating a first input voltage responsive to the output of said oscillator, means for applying the thus modulated voltage across said first and third bridge terminals, means for applying a second input voltage to a first junction between said first and second voltage sensitive capacitors, means for applying the inversion of said second input voltage to a second junction between said third and fourth voltage sensitive capacitors, means for biasing said first and second junction so as to prevent conduction by any of said first, second, third, and fourth voltage sensitive capacitors, means for amplifying the voltage across said second and fourth terminals, means for inverting the thus amplified voltage and means for demodulating the thus inverted voltage in response to the output of said oscillator, the thus demodulated voltage being proportional to the multiplication product of said first and second input voltages.

5. A system for producing an output voltage proportional to a multiplication product of a first input voltage and second input voltage, comprising in combination:
(1) a bridge circuit comprising first and second voltage sensitive capacitors connected in series in back-to-back relationship in the first arm of said bridge circuit, third and fourth voltage sensitive capacitors connected in series in front-to-front relationship in a second arm of said bridge circuit, said first and second arms being adjacent arms in said bridge circuit and having a common terminal, third and fourth arms connected between an output bridge terminal and the non-common terminals of said first and second arms;

(2) a first signal input circuit comprising means for converting said first input voltage into a high frequency A.C. voltage, means for applying said high frequency A.C. voltage across said non-common terminals of said first and second arms;

(3) a second signal input circuit comprising means for applying said second input voltage to a first junction between said first and second voltage sensitive capacitors and to a second junction between said third and fourth voltage sensitive capacitors;

(4) a biasing means comprising means for biasing said voltage sensitive capacitors so as to prevent conduction by any of said voltage sensitive capacitors;

(5) an output circuit comprising means for amplifying the voltage between said output bridge terminal and said common terminal, means for inverting the thus amplified voltage, means for converting the thus inverted voltage into a D.C. voltage proportional to the multiplication product of first and second input voltages.

6. An analog multiplier having first, second, third and fourth bridge terminals, first and second voltage sensitive capacitors connected in series in back-to-back relationship between said first and second bridge terminals, third and fourth voltage sensitive capacitors connected in series in front-to-front relationship between said second and third bridge terminals, a third arm of said bridge connected between said first and fourth bridge terminals, a fourth arm of said bridge connected between said third and fourth bridge terminals, an oscillator, means for modulating a first input voltage responsive to the output of said oscillator, means for applying the thus modulated voltage across said first and third bridge terminals, means for applying a second input voltage to a first junction between said first and second voltage sensitive capacitors and to a second junction between said third and fourth voltage sensitive capacitors, means for biasing said voltage sensitive capacitors so as to prevent conduction by any of said first, second, third, and fourth voltage sensitive capacitors, means for amplifying the voltage across said second and fourth terminals, means for inverting the thus amplified voltage, and means for demodulating the thus inverted voltage in response to the output of said oscillator, the thus demodulated voltage being proportional to the multiplication product of said first and second input voltages.

7. An analog multiplier for obtaining the algebraic multiplication product of a first value and a second value comprising a bridge network, a first input circuit, a second input circuit, and an output circuit; said bridge network comprising first, second, third and fourth bridge terminals, first and second silicon capacitors connected between said first and second bridge terminals, and third and fourth silicon capacitors connected between said second and third bridge terminals; said first input circuit comprising means for applying an A.C. voltage representative of said first value to said first and third bridge terminals; said second input circuit comprising means for applying a voltage representative of said second value to said first, second, third and fourth silicon capacitors in such a manner as to increase the capacitance of said first and second silicon capacitors while decreasing the capacitance of said third and fourth silicon capacitors in response to a change in the value of said voltage representative of said second value in a first direction and decreasing the capacitance of said first and second silicon capacitors while increasing the capacitance of said third and fourth silicon capacitors in response to a change in the value of said voltage representative of said second value in a second direction opposite to said first direction; and said output circuit comprising means connected to said second and fourth bridge terminals for converting the bridge network output to a D.C. voltage, the magnitude of which is proportional to the multiplication product of said first and second values.

References Cited in the file of this patent

UNITED STATES PATENTS

| | | |
|---|---|---|
| 2,835,444 | Blake et al. | May 20, 1958 |
| 2,935,260 | Philbrick et al. | May 3, 1960 |